(12) United States Patent
Niesen (10) Patent No.: US 7,068,615 B2
(45) Date of Patent: Jun. 27, 2006

(54) ADAPTABLE FORWARD LINK DATA RATES IN COMMUNICATIONS SYSTEMS FOR MOBILE PLATFORMS

(75) Inventor: Joseph W. Niesen, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 501 days.

(21) Appl. No.: 10/042,585

(22) Filed: Jan. 9, 2002

(65) Prior Publication Data
US 2003/0128671 A1 Jul. 10, 2003

(51) Int. Cl.
*H04B 7/216* (2006.01)

(52) U.S. Cl. .................. 370/313; 370/316; 370/320; 370/335; 370/342; 455/98; 455/102; 455/430

(58) Field of Classification Search ........ 455/430–432, 455/69, 98, 126, 500, 505, 102; 370/204, 370/313, 316, 320, 335, 342
See application file for complete search history.

(56) References Cited

U.S. PATENT DOCUMENTS

| | | | | |
|---|---|---|---|---|
| 5,103,459 A | * | 4/1992 | Gilhousen et al. | 370/206 |
| 5,341,396 A | | 8/1994 | Higgins et al. | |
| 5,751,761 A | * | 5/1998 | Gilhousen | 375/146 |
| 6,163,524 A | * | 12/2000 | Magnusson et al. | 370/208 |
| 6,233,231 B1 | | 5/2001 | Felix et al. | |
| 2002/0018527 A1 | * | 2/2002 | Vanderaar et al. | 375/259 |

FOREIGN PATENT DOCUMENTS

| | | |
|---|---|---|
| EP | 0 986 282 A1 | 3/2000 |
| EP | 1 117 184 A1 | 7/2001 |
| EP | 1 130 837 A2 | 9/2001 |
| WO | WO 01/76103 A1 | 10/2001 |

OTHER PUBLICATIONS

Lee et al., "The Internet Protocol version 6", Apr. 1998, IEEE, IEEE Potentials, pp. 11-12.*
Lee et al., "The Next Generation of the Internet: Aspects of the Internet Protocol Version 6", Jan. 1998, IEEE, IEEE Network, pp. 28-33.*

(Continued)

*Primary Examiner*—Huy D. Vu
*Assistant Examiner*—Justin M. Philpott
(74) *Attorney, Agent, or Firm*—Harness Dickey & Pierce P.L.C.

(57) ABSTRACT

A communication system for mobile platforms includes mobile platforms with transceivers identified by Internet Protocol (IP) addresses. A satellite relays a forward link from a ground station to the mobile platforms. The forward link contains IP packet data that is modulated by variable length orthogonal (VLO) spreading codes and that has different information data rates. The VLO spreading code for each IP packet is selected to optimize a desired link margin of the IP packet that is received by the addressed transceiver. The IP packets can also be modulated using a pseudonoise (PN) spreading code. Forward error correction (FEC) may also be applied. The transceivers include a feedback circuit that generates an $E_b/N_o$ estimate.

35 Claims, 12 Drawing Sheets

OTHER PUBLICATIONS

A Study of Multimedia CDMA System for Personal Satellite Communication by Ikegami, Takahashi, Tanaka and Wakana, pp. 76-80.

International Search Report dated May 12, 2003 for PCT/US 03/00485, 3 pages.

Proposed U.S. Global Satellite Systems Operating at Ka-Band by Evans, pp. 525-537.

Rate Adaptive OFDM (RA-OFDM) Spread Spectrum System for Leo Satellite Communications by Ye, Saulnier and Medley, pp. 621-625.

Adachi/Sawahashi/Suda; IEEE Communications Magazine, "Wideband DS-CDMA For Next-Generation Mobile Communications Systems"; Sep. 1998; p. 56-69.

Dinan/Jabbarl; IEEE Communications Magazine, "Spreading Codes for Direct Sequence CDMA and Wideband CDMA Cellular Networks"; Sep. 1998; p. 48-54.

Ojanpera/Prasad; IEEE Communications Magazine, "An Overview of Air Interface Multiple Access for IMT-2000/UMTS"; Sep. 1998; p. 82-95.

* cited by examiner

ADAPTABLE FORWARD LINK DATA RATES IN COMMUNICATIONS SYSTEMS FOR MOBILE PLATFORMS

FIELD OF THE INVENTION

The present invention relates to communications systems for mobile platforms, and more particularly to communications systems including satellites with adaptable forward link data rates.

BACKGROUND OF THE INVENTION

Broadband communications access, on which our society and economy is growing increasingly dependent, is now becoming available to users on board mobile platforms such as aircraft, ships, automobiles and trains. Broadband communication services for passengers of the mobile platform include Internet access, movies on demand, rebroadcast live television, virtual private network access and other interactive and real time services. While the technology exists to deliver the broadband communication services to mobile platforms, conventional communications systems have been commercially unacceptable for various reasons including the relatively high cost of service and/or low data rates.

Communication systems for mobile platforms usually include satellites having a footprint that covers a specific region of the earth that requires service. For communications systems with geosynchronous satellites, the footprint covers a relatively fixed region of the earth. For satellites with low and medium earth orbits, the footprints cover a moving region, in other words the footprints sweep across the earth. Ground stations send data to the mobile platforms through a bent pipe via one or more satellites. The mobile platforms, in turn, send data to the ground stations via the satellite. The ground stations provide the mobile platform with links to the Internet, private networks, and/or other servers and services.

Figure 1:
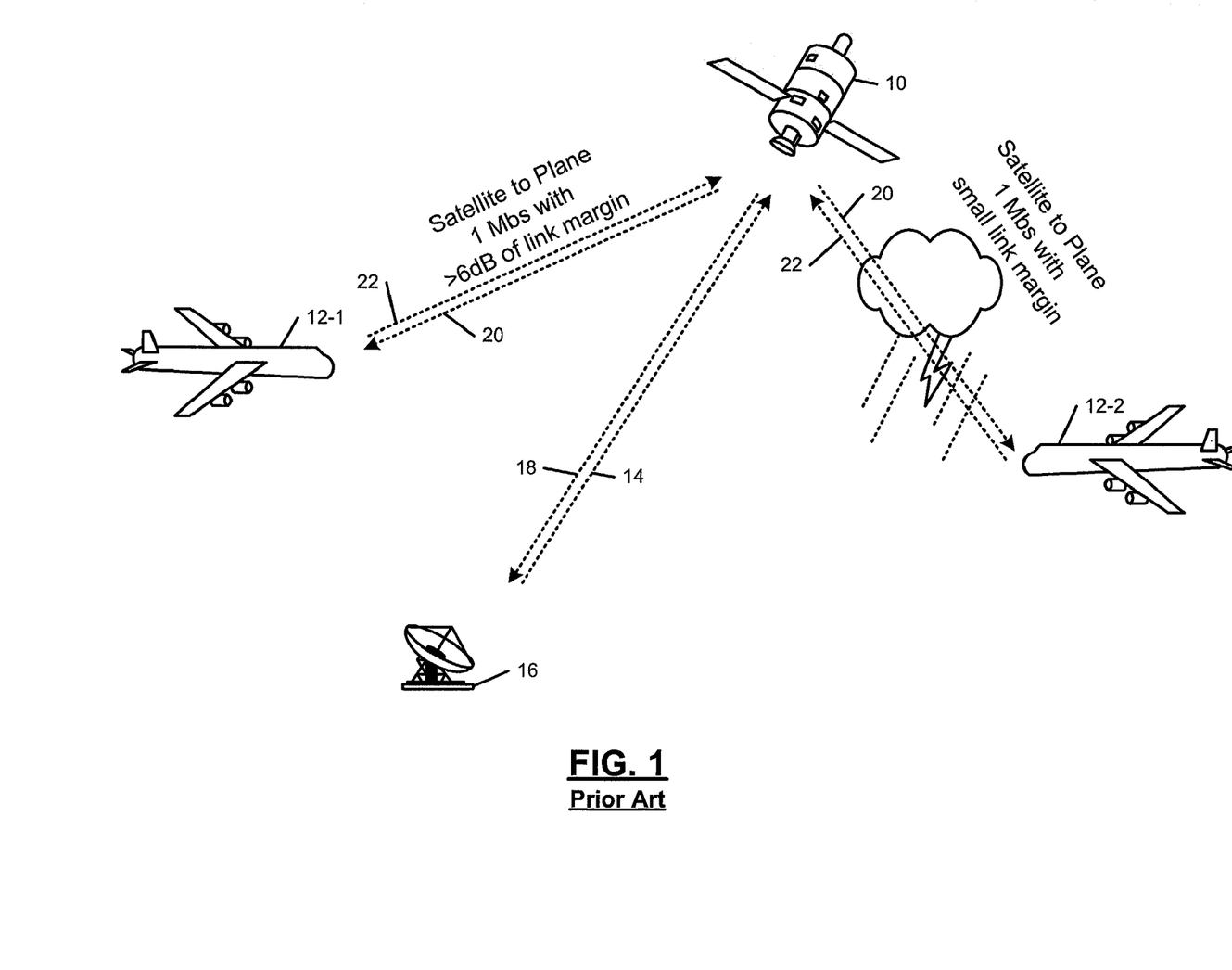
FIG. 1 illustrates a communication system for mobile platforms according to the prior art.

Referring now to FIG. 1, a satellite 10 covers a region of the earth that includes multiple mobile platforms 12. The mobile platforms 12 can be airplanes that are depicted in FIG. 1, other air-based mobile platforms or ground-based mobile platforms such as trains, ships and automobiles. The satellite 10 relays a forward link 20 from the ground station 16 to the mobile platforms 12. The satellite 10 relays a return link 22 from the mobile platforms 12 to the ground station. The forward link 20 received by the mobile platform 12-1 may have different radio frequency (RF) power losses than the forward link 20 to the mobile platform 12-2.

The different RF power losses of the mobile platforms are due to space loss and/or other losses. Space losses occur at the periphery of the satellite beam as the distance between the satellite 10 and the mobile platform 12 increases. The type of antenna, the pointing accuracy of the antenna and the mechanical orientation of the antenna with respect to its radiation pattern may also impact RF loss of the mobile platform 12. Some link losses depend on the variations that occur during manufacturing of the satellite communications hardware. Other link losses depend on environmental conditions and on region-specific interference such as weather, electromagnetic interference, and/or thermal noise.

Both the cost of service and the speed of conventional communication systems are adversely impacted by the requirement that the data rate of the satellite 10 is limited to the data rate supported by the weakest communication link. For example, the mobile platform 12-2 is capable of receiving data at 1 Mbps with a small link margin due to a storm between mobile platform 12-2 and the satellite 10. The mobile platform 12-1, however, that is not hindered by the storm must also receive data at 1 Mbps. The mobile platform 12-1 has greater than 6 dB of link margin. Therefore, the mobile platform 12-1 is capable of receiving data at a much higher data rate. In other words, the mobile platform 12-1 has a significant amount of unusable link margin.

SUMMARY OF THE INVENTION

A communication method and system according to the present invention for mobile platforms includes a first mobile platform with a first transceiver that is assigned a first Internet Protocol (IP) address. A second mobile platform includes a second transceiver that is assigned a second IP address. A ground station transmits a forward link that contains first and second IP packet data that is modulated by a variable length orthogonal (VLO) spreader. The first and second IP packet data have different information data rates. A satellite relays the forward link from the ground station to the first and second mobile platforms.

In other features of the invention, the ground station includes a forward error correction (FEC) encoder that applies FEC coding to the first and second IP packet data and wherein the VLO spreader communicates with an output of the FEC encoder. The ground station includes a pseudonoise (PN) spreader that spreads an output of the VLO spreader.

In other features, the first and second mobile platforms include a pseudonoise (PN) despreader that despreads an data received on the forward link. The first and second mobile platforms include a VLO despreader that despreads an output of the PN despreader. The first and second mobile platforms include a FEC decoder that decodes an output of the PN despreader.

In yet other features, the ground station selects a first VLO spreading code to optimize a first desired link margin of the first transceiver and a second VLO spreading code is selected to optimize a second desired link margin of the second transceiver. The first transceiver includes a feedback circuit that generates a link margin estimate for the first IP packet received by the first transceiver. The ground station receives the link margin estimate and adjusts the information data rate of subsequent IP packets. The feedback circuit of the first transceiver includes a signal estimator that generates a bit energy signal and a noise estimator that generates a noise estimate signal. The feedback circuit transmits the link margin estimate to the ground station.

In still other features, the ground station adjusts the VLO spreading code to optimize the link margin of the first transceiver. Alternately, the ground station adjusts the VLO spreading code and FEC coding of the FEC encoder to optimize the link margin of the first transceiver. The VLO code despreader responds to VLO timing sequence data contained in an overhead portion of an output of the PN despreader.

In still other features, the first IP packet is addressed to the first transceiver located on the first mobile platform and the second IP packet is addressed to the second transceiver located on a second mobile platform. The forward link includes first and second broadcast frames that are transmitted concurrently. The concurrent broadcast frames have distinct VLO codes and substantially the same signal strength.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2:
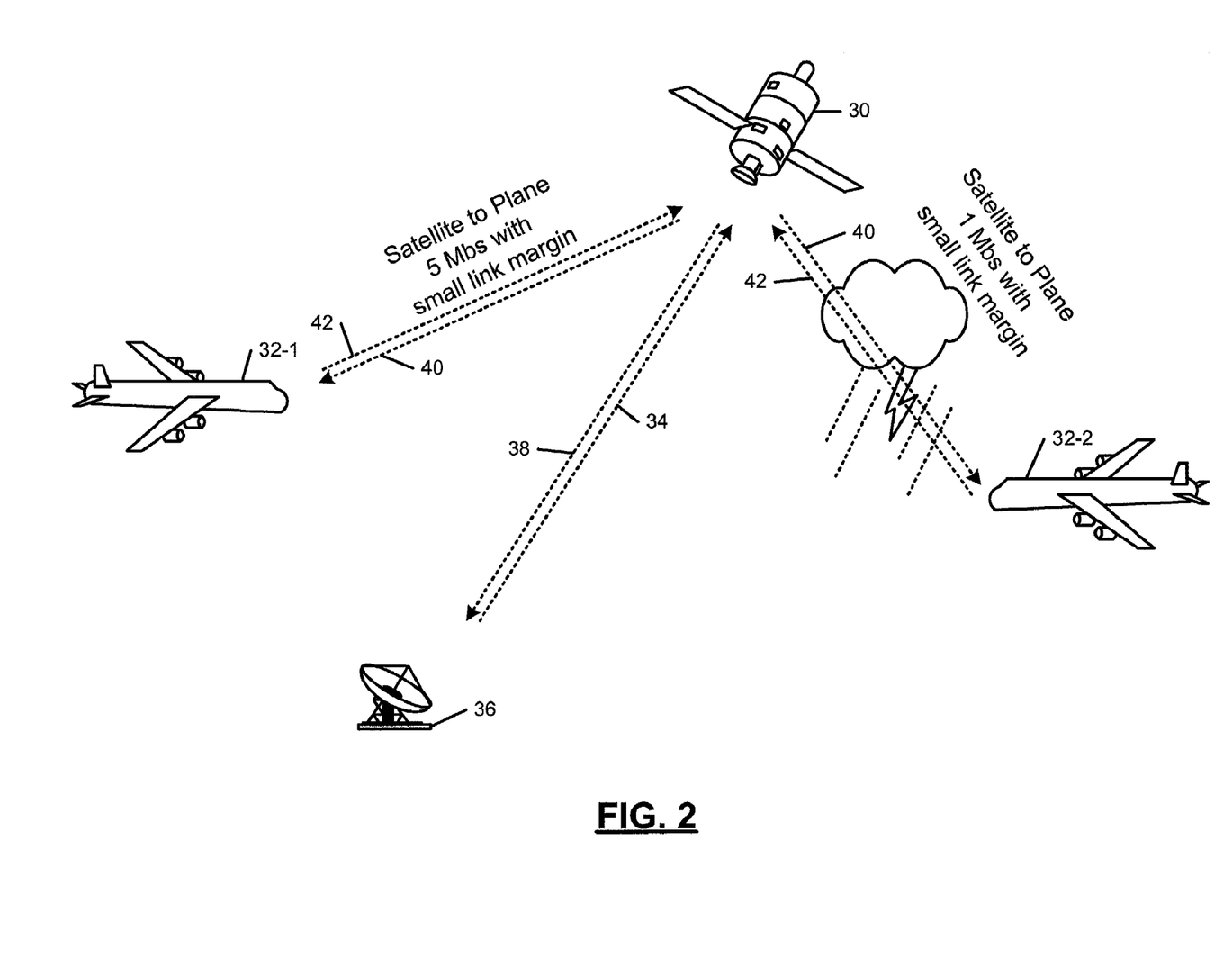
FIGS. 2 and 3 illustrate exemplary communication systems for mobile platforms according to the present invention.
Figure 3:
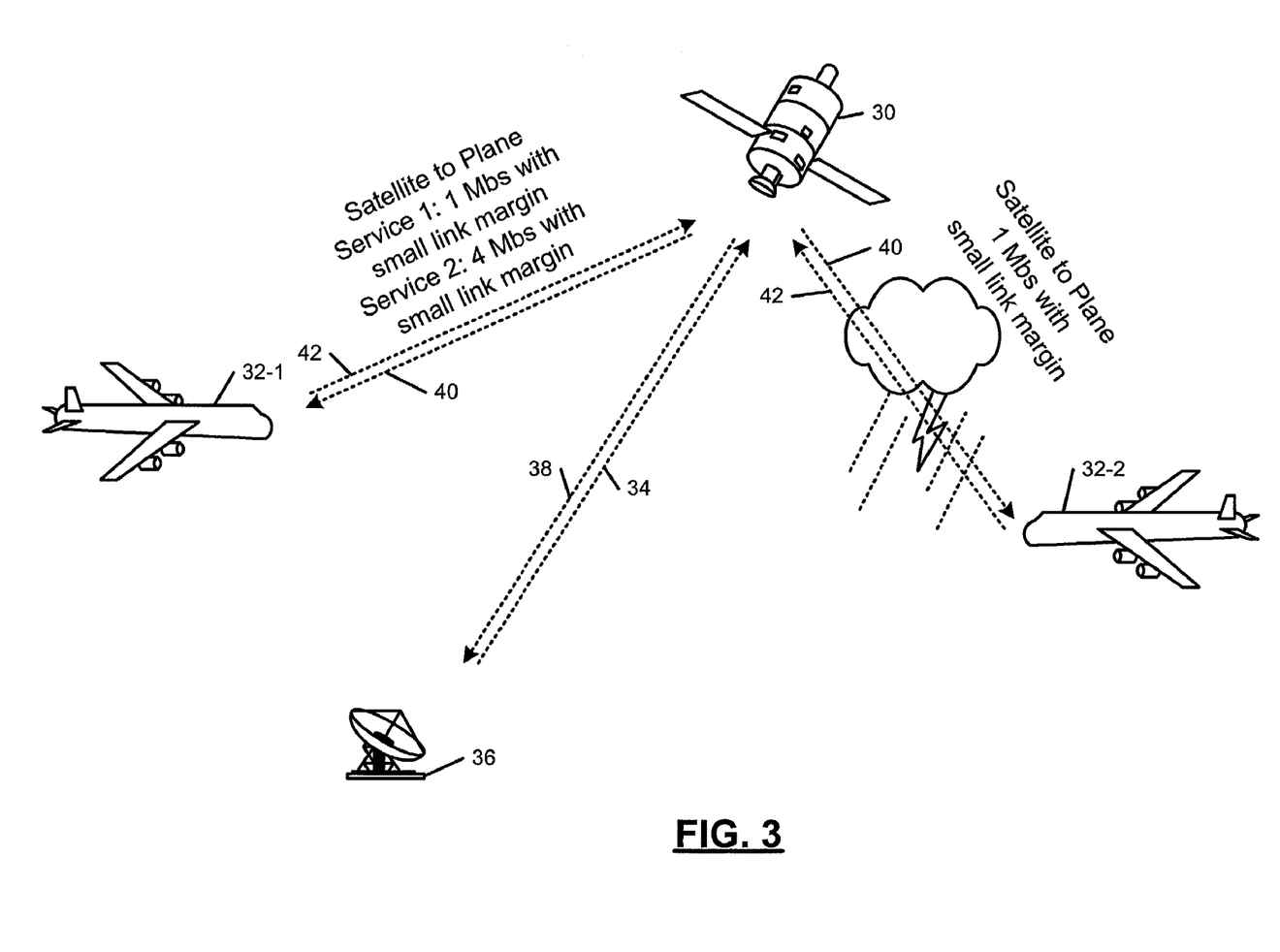

Referring now to FIGS. 2 and 3, a satellite 30 covers a region of the earth that includes multiple mobile platforms 32. While the present invention will be described in conjunction with "bent-pipe" satellite systems, skilled artisans will appreciate that the present invention has application other types of satellite systems. For example, satellite systems with on-board packet switching are also contemplated.

The mobile platforms 32 can be airplanes that are depicted in FIG. 1, other air-based mobile platforms or ground-based mobile platforms such as trains, buses, ships and automobiles. The satellite 30 relays a forward link 34 from a ground station 36 to the mobile platforms 32. The satellite 30 relays a return link 38 from the mobile platforms 32 to the ground station 36. The mobile platform 32-1 may have different radio frequency (RF) power losses than the mobile platform 32-2 due to space loss and/or other losses that were previously described above.

The present invention utilizes excess link margin on the forward link to the mobile platform 32-1 to increase the data rate to the mobile platform 32-1 and/or to other mobile platforms 32 that can support the increased data rate. Sending data at the higher data rate to the mobile platforms 32 with excess link margin allows the satellite 30 and/or the ground station 36 to send additional packets to the mobile platforms 32 with the lower link margin. As a result, the throughput for all of the mobile platforms 32 that are serviced by the satellite 30 and the ground station 36 can be increased.

For example, the mobile platform 32-2 is capable of receiving data at 1 Mbps with a small link margin due to a storm between mobile platform 32-2 and the satellite 30. In conventional communications systems, the mobile platform 32-1 (that is not hindered by the storm) also must receive data at 1 Mbps. The forward link 40 to the mobile platform 32-1, however, has greater than 6 dB of link margin. Therefore, the mobile platform 32-1 is capable of receiving data at a much higher data rate with a lower link margin. In other words, the mobile platform 32-1 has a significant amount of unusable link margin.

The present invention employs higher data rates for mobile platforms 32 with excess link margin. By design, there is steady RF power through the transceiver of the satellite 30. The data rate is increased and decreased while the RF transceiver power is maintained at a fixed level. To maintain the bit error rate (BER) below a predetermined level, the information data rate is adjusted to maintain the required $E_b/N_o$. A variable length orthogonal spreading code and spectral spreading with a maximal length linear sequence (such as pseudonoise (PN) spreading) are used to achieve efficient transmission control protocol (TCP) throughput while spreading the data for each mobile platform to fill the transceiver bandwidth.

For example, in FIG. 2 the present invention adjusts the data rate of one or more packets in a broadcast frame to provide a data rate of 5 Mbps with a small link margin for the mobile platform 32-1. Other packets in the broadcast frame have a data rate of 1 Mbps with a small link margin. The present invention maintains the required link margin by adjusting the coding gain for the transceiver(s) of each mobile platform. Increasing the coding gain reduces the data rate. For Internet protocol applications and other applications that are sensitive to the bit error rate (BER) and packet error rate (PER) for their throughput efficiency, it may be necessary to operate at a low bit error rate (typically less than $10e^{-09}$). The present invention achieves the link margin necessary to produce a low BER for multiple users with various levels of RF loss on the link between the satellite 10 and the mobile platform 32. The reduction in data rate is optimized to achieve sufficient yet not excessive link margin.

The mobile platforms 32 may include more than one transceiver and/or each transceiver may have different link margin specifications for different service(s). For example, IP packets relating to Internet services may have a different link margin requirement than IP packets for Intranet services. In FIG. 3, the present invention adjusts the data rate to provide first IP packets at 5 Mbps with a small link margin and second IP packets at 1 Mbps with a small link margin for one or more transceivers of the mobile platform 32-1. The mobile platform 32-2 still receives 1 Mbps IP packets with a small link margin.

The present invention employs multiple access coding and variable length orthogonal coding in combination. The combination maintains the operational features of multiple access coding while adding the data rate adaptability of variable length orthogonal coding provides. The product of the variable length orthogonal code spreading factor and the associated information data rate is a constant that is equal to the highest data rate supportable for the mobile platforms 32 that are serviced by the satellite 30 in the case of nonconcurrent VLO packet streams. The present invention uses variable length orthogonal codes to adapt the data rate to maintain low BER for a coverage region and for the number of transceivers that are associated with the mobile platforms 32.

Figure 4:
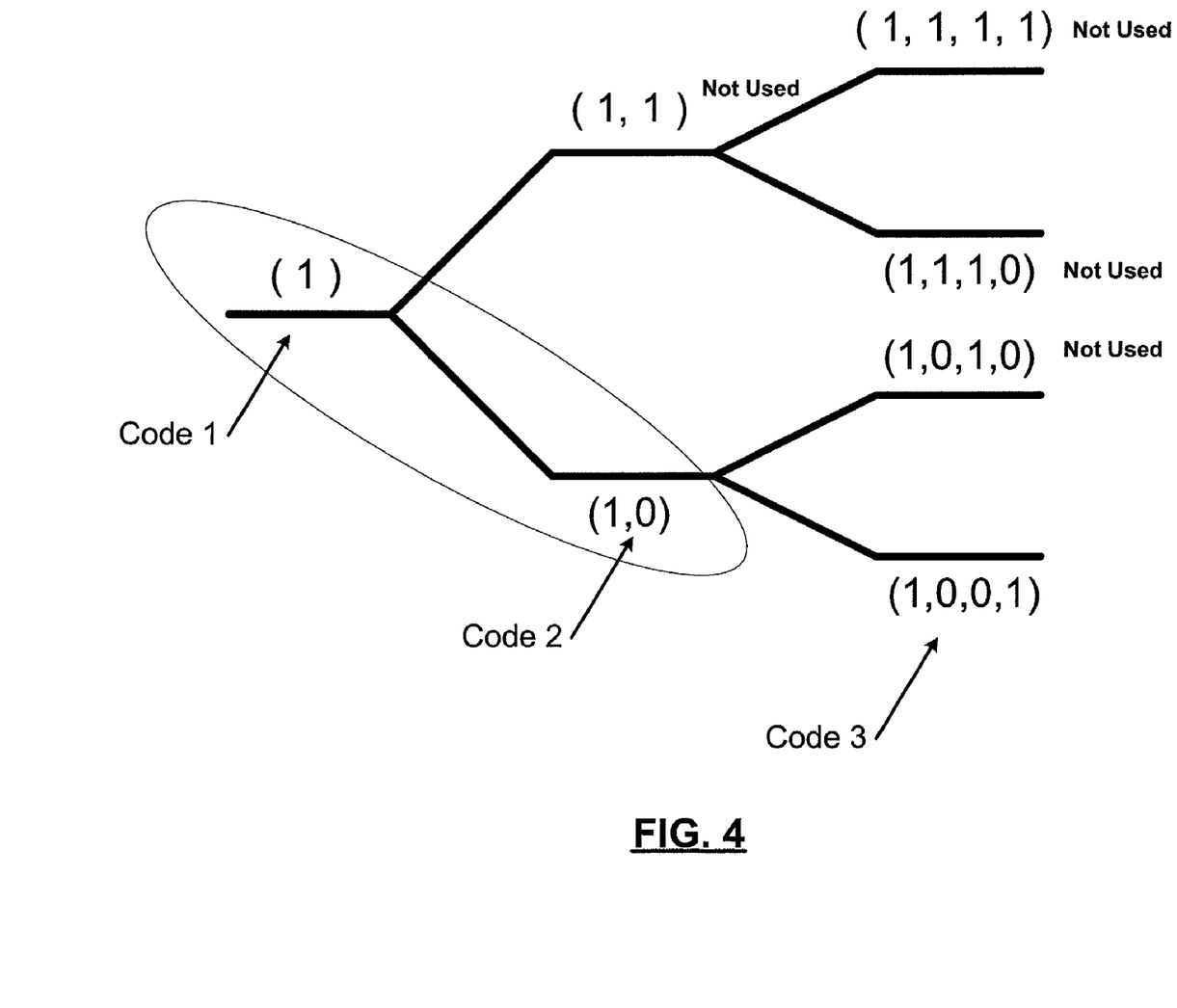
FIG. 4 illustrates exemplary orthogonal spreading codes.

Referring now to FIG. 4, an exemplary variable length orthogonal coding tree according to the present invention is illustrated. Orthogonal code 1 has a length of one and is equal to {1} (or {−1}). Orthogonal code 2 has a length of two and is equal to {1, −1} (or {−1, 1}). Orthogonal code 3 has a length of four and is equal to {1, −1,−1,1} (or {−1,1,1,−1}). In binary representation, VLO code 1 is {1} (or {0}). Orthogonal code 2 has a length of two and is equal to {1, 0} (or {0, 1}). Orthogonal code 3 has a length of four and is equal to {1, 0,0,1} (or {0, 1, 1,0}).

The BER and PER specifications are adjusted by the setup of the particular IP application or service that is running. The transceivers on the mobile platforms 32 are addressed using a unique IP address that is assigned to the transceiver. Variable length orthogonal codes are used to adapt the data rate for the transceivers of the mobile platforms 32 to achieve sufficiently low BER and PER for the particular service that is desired. The present invention advantageously compensates for transceiver directive gain falloff with latitude and longitude and allows an extended latitude range for airplane operation.

The transceiver on the mobile platform 32 synchronizes with the PN spreading code. Then, the transceiver synchronizes with the assigned variable length orthogonal code. After evaluating the communication link loss, the spreading code rate contributed by the variable length orthogonal code is set such that the VLO spread code rate times the information data rate is the highest data rate of the channel in the case of non-concurrent VLO packet streams.

The present invention uses the variable length orthogonal coding to set the IP broadcast forward link data rate. The present invention addresses problems encountered by communication systems having large satellite beams with spot regions that require special link margin attention; satellites with multi beam antennas producing many spot beams needing to provide simultaneous services within a beam; and satellites with on-board processing able to estimate $E_b/N_o$ and command forward link data rate changes in response. IP addressing and IP address packet filtering are preferably used for the data delivery architecture of the communications system of the present invention.

PN sequence spreading is used in addition to the proposed spectral spreading design to insure full transceiver channel spreading, and to facilitate communication signal acquisition. As a result, the transceivers on a particular mobile platform operate with or without VLO coding gain. PN sequence spreading is used for the highest data rate channel to spread the bandwidth to fill the channel. The effect of the assignment of orthogonal coding (with its associated spreading factor) is to reduce the information data rate in order to sustain some margin from mobile platforms experiencing BER degradation. The present invention avoids reduced throughput due to high packet error ratio (PER) by employing forward error correction (FEC) coding with a sharp BER versus $E_b/N_o$ response, and adjusting the VLO coding gain to stay sufficiently away from the knee of the BER versus $E_b/N_o$ curve.

Figure 5A:
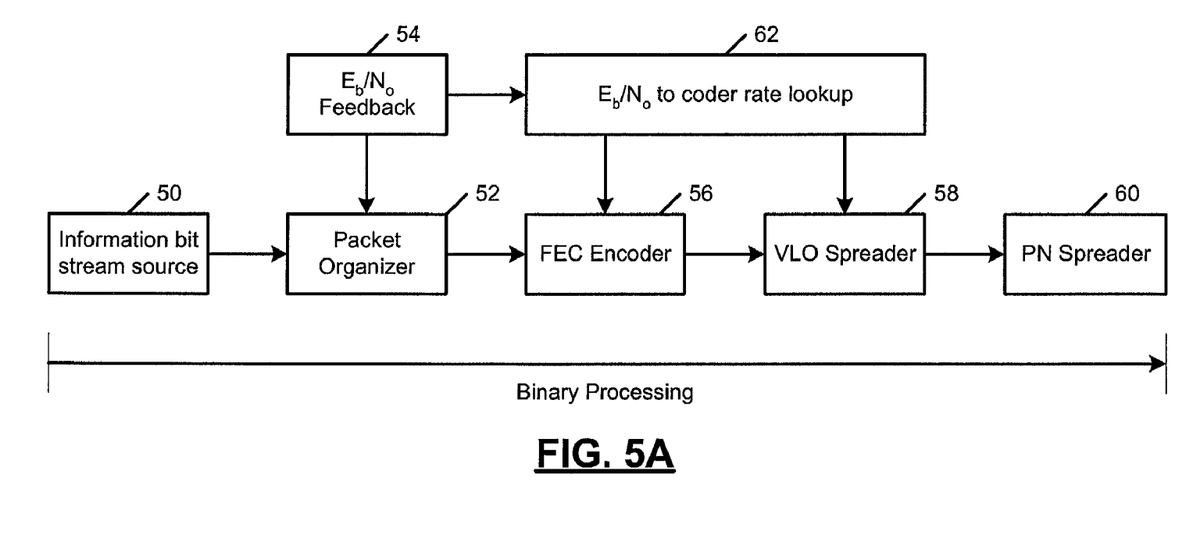
FIGS. 5A and 5B illustrate binary processing of an information bit stream.
Figure 5B:
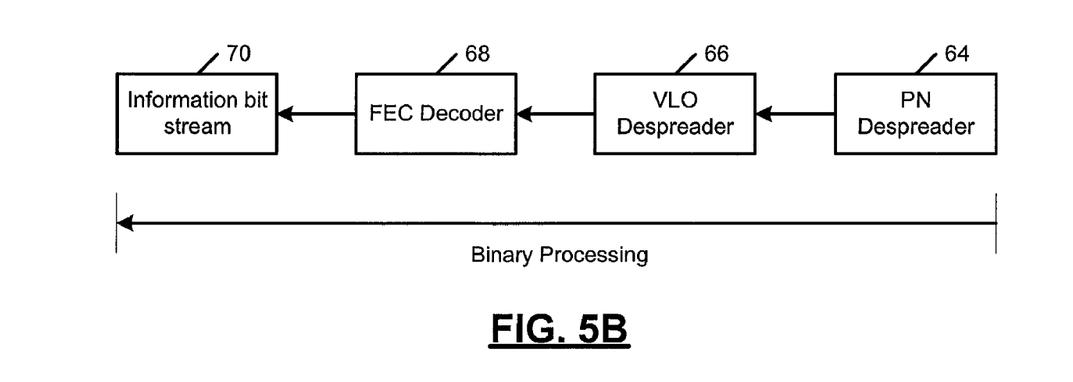

Referring now to FIGS. 5A and 5B, binary processing of data is shown. In FIG. 5A, processing by the ground station is shown. An information bit stream 50 includes IP packets for various mobile platforms. The information bit stream 50 is output to a packet organizer 52 that receives $E_b/N_o$ feedback from the mobile platforms as will be described below. The packet organizer 52 organizes the IP packets according to the $E_b/N_o$ feedback. For example, slower rate IP packets are grouped together, medium rate IP packets are grouped together and fast IP packets are grouped together. Once organized, the IP packets are output to a forward error correction (FEC) encoder 56. An output of the FEC encoder 56 is input to a VLO spreader 58. An output of the VLO spreader 58 is input to a pseudonoise (PN) spreader 60. An output of the $E_b/N_o$ feedback 54 is input to a $E_b/N_o$ to coder rate lookup 62. An output of the lookup 62 is input to the FEC encoder 56 and the VLO spreader 58. In FIG. 5B, at the mobile platform, a PN despreader 64 receives the data. A VLO despreader 66 despreads the data. A FEC decoder 68 decodes the data to recover the information bit stream including IP packets.

Figure 6A:
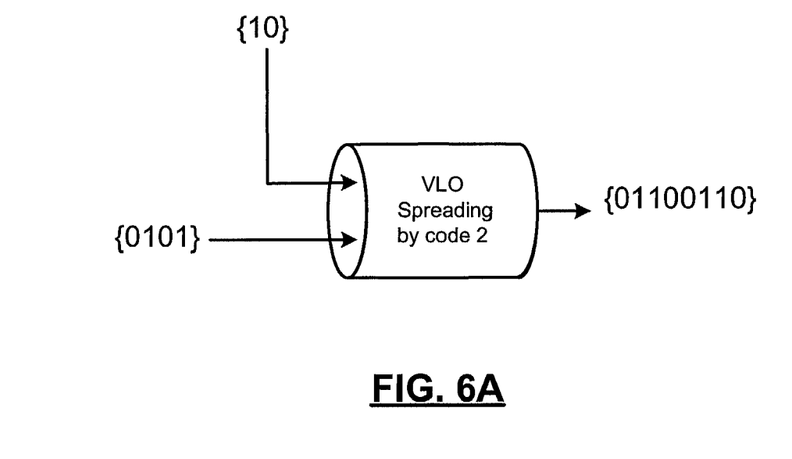
FIGS. 6A and 6B illustrate two exemplary variable length orthogonal spreading codes applied to forward link data.
Figure 6B:
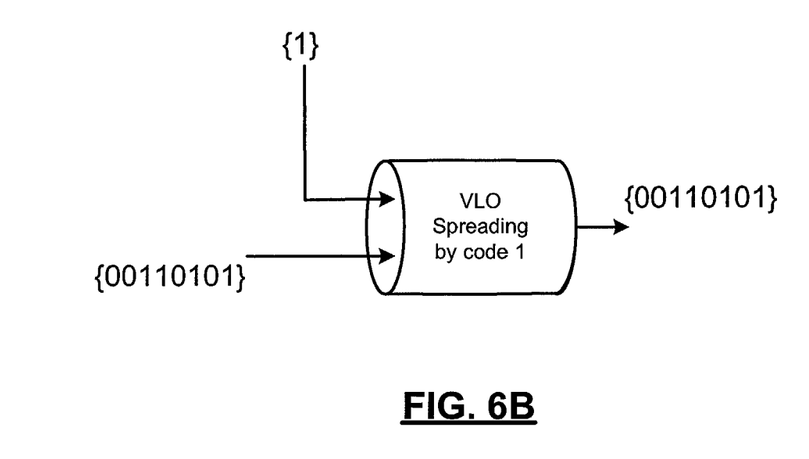

Referring now to FIGS. 6A and 6B, the VLO code and the information bit stream are exclusive OR'd in binary processing to generate the VLO spread stream. The output rate of the exclusive OR is the same for each of the different information rates. In FIG. 6A, the slower information rate is for the disadvantaged link. The slower information rate VLO spread stream requires twice as long to transmit the same amount of data as the faster information rate stream. For the same, packet size, the slower information rate stream takes twice as long to send its packet as the faster information rate stream.

Figure 7:
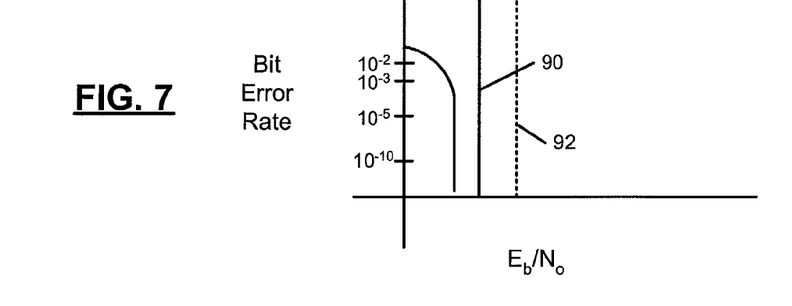
FIG. 7 illustrates Bit Error Rate (BER) as a function of a ratio of bit energy/signal noise ($E_b/N_o$)

Referring now to FIG. 7, the bit error rate is illustrated as a function of a ratio of bit energy/noise ($E_b/N_o$). A receiver experiencing higher space loss and other losses (identified at 90 in FIG. 6) has an optimized link margin that is relatively small. A receiver experiencing lower space and other losses (identified at 92) has excess link margin.

The present invention transmits additional IP packets on the lower data rate link and improves the IP packet throughput for the lower data rate link. The receivers on the mobile platforms receive the same packet throughput rate. By speeding up data transmission for receivers with excess link margin, the slowest data rate link can also increase packet throughput due to the extra time slots that can be allocated to it.

Figure 8:
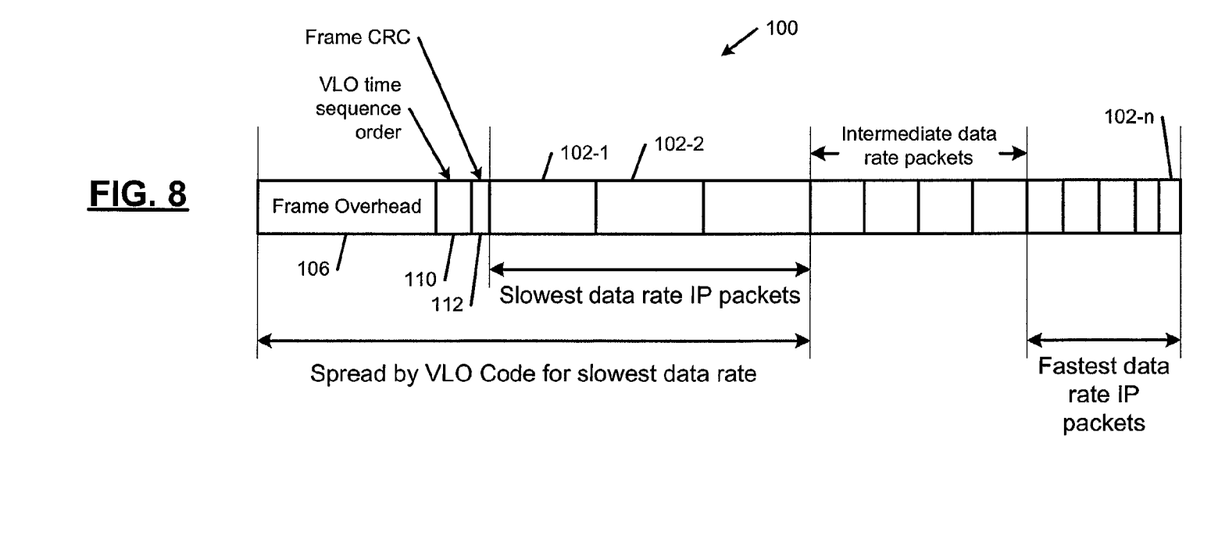
FIG. 8 illustrates a broadcast frame of the forward link with variable data rate blocks.

Referring now to FIG. 8, a broadcast frame 100 including a plurality of blocks 102 is shown. The satellite broadcast frame 100 includes overhead 104 with a frame overhead portion 106 that is preferably transmitted using the VLO code for the slowest data rate. The overhead 104 further includes a time sequence order header portion 110 that specifies the VLO coding of the blocks 102 that follow the header portion 106. Additional blocks are transmitted at low, intermediate and/or high data rates where appropriate. As will be described in more detail below, the transceiver of the mobile platform 32 includes a bit energy/noise feedback circuit that determines the bit energy to noise ratio of the forward link for the mobile platform 32. The transceiver transmits the signal to noise ratio back to the satellite 30 and the ground station 36. Alternately, the transceiver transmits VLO code designation(s) for the particular services back to the satellite 30 and the ground station 36. The transceivers also include a VLO code despreader that recovers the data contained in the blocks as will be described more fully below.

Figure 9A:
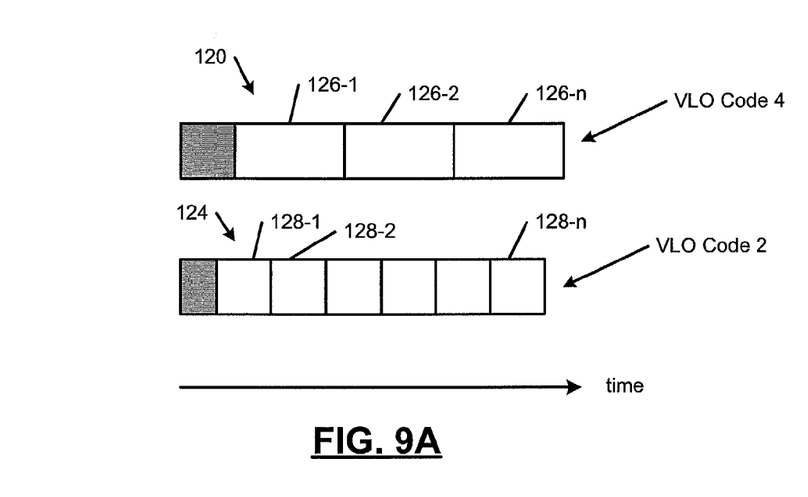
FIGS. 9A and 9B illustrates a set of link layer frames that are transmitted concurrently on the forward link and that are distinguished by VLO coding.
Figure 9B:
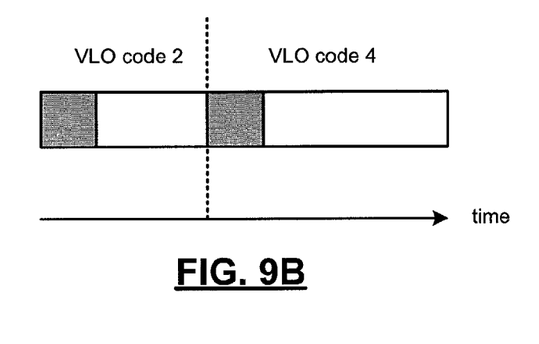
Figure 10:
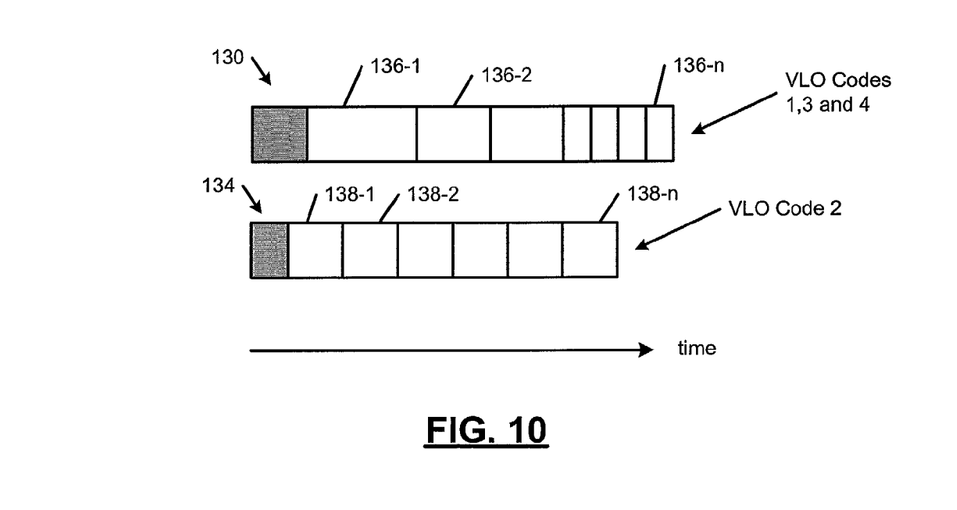
FIG. 10 illustrates concurrent frames with a variable data rates.

Variable length orthogonal coding (VLO) allows two or more frames to be transmitted concurrently as is illustrated in FIGS. 9 and 10. For example in FIG. 9, broadcast frames 120 and 124 are shown. The broadcast frames 120 and 124 can be transmitted concurrently as long as the VLO codes that are used by the frames are different. For example, the frame 120 includes forward error correcting code block frames 126-1, 126-2, . . . and 126-n with VLO Code 4. The frame 124 includes forward error correcting code block frames 128-1, 128-2, . . . and 128-n with VLO Code 2. This approach can be used to segregate disparate services, such as DSS TV, IPSEC, and unencrypted IP applications. The broadcast frame 120 and 124 preferably have substantially the same signal strength.

Referring now to FIG. 10, broadcast frames 130 and 134 are shown. The frame 130 includes blocks 136-1, 136-2, . . . and 136-n with VLO codes 1, 3 and 4. The frame 124 includes blocks 138-1, 138-2, . . . and 138-n with VLO code 2. As can be appreciated, other combinations of VLO codes can be employed. Orthogonal spreading allows the concurrent transmission with no interference and full user data separation at the transceiver. Each of N concurrent frames share the RF transmit power of the satellite transceiver. The power sharing directly impacts the $E_b/N_o$ ratio of the frame and must be considered when determining the data rate(s) that are transmitted within the frame. Another option is a single string of frames with each frame at a different information data rate/VLO code rate.

Figure 11:
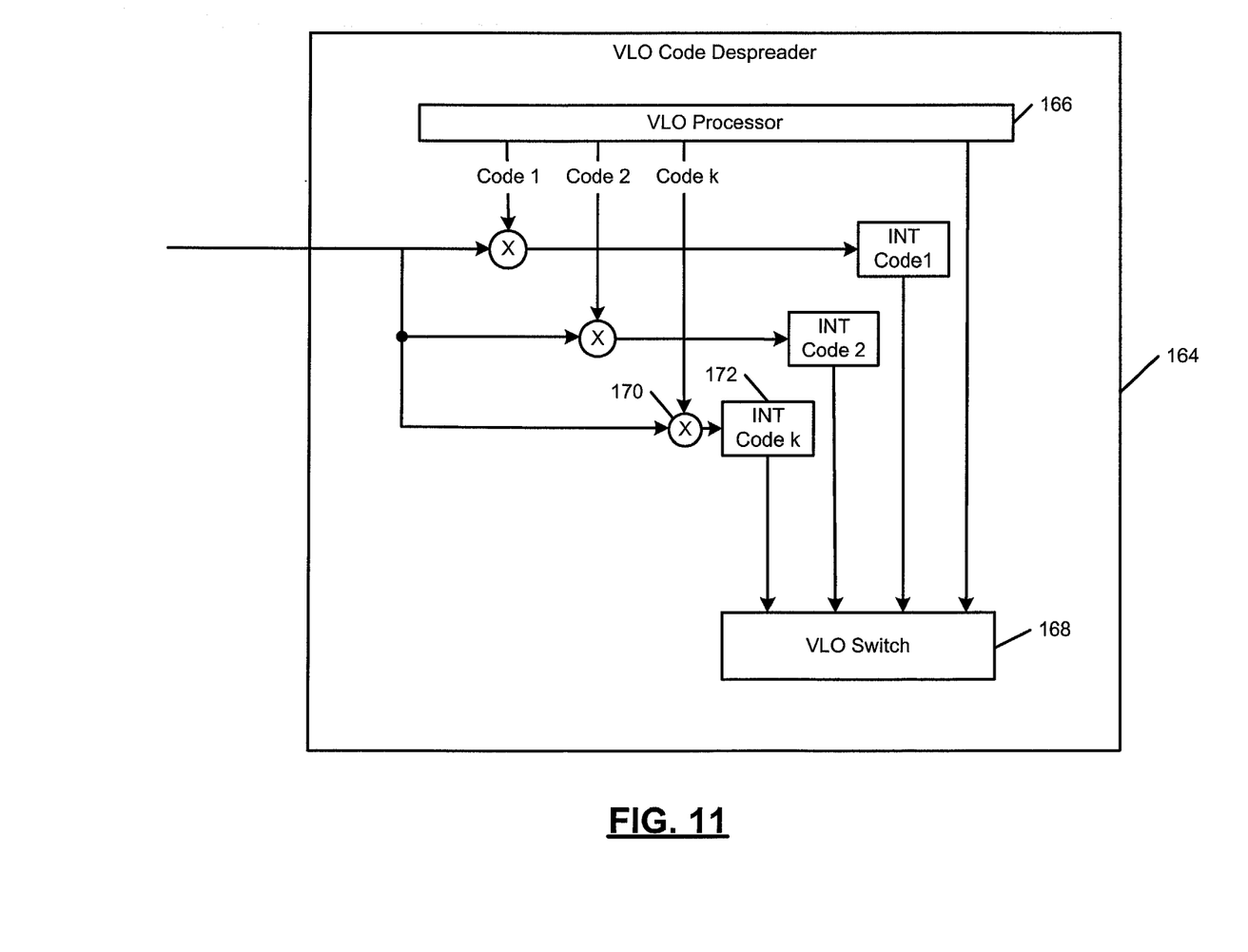
FIG. 11 is a block diagram of a VLO despreader.

Referring now to FIG. 11, a VLO code despreader 164 is shown. The VLO code despreader 164 includes a processor 166 with memory (not shown) such as random access memory (RAM), read only memory (ROM), flash memory or other electronic storage. The VLO code despreader 164 further includes a switch 168 and a plurality of multipliers 170 and integrating circuits 172. The VLO processor 166 uses the VLO sequence order to send properly timed switching commands to the VLO switch 168.

Figure 12:
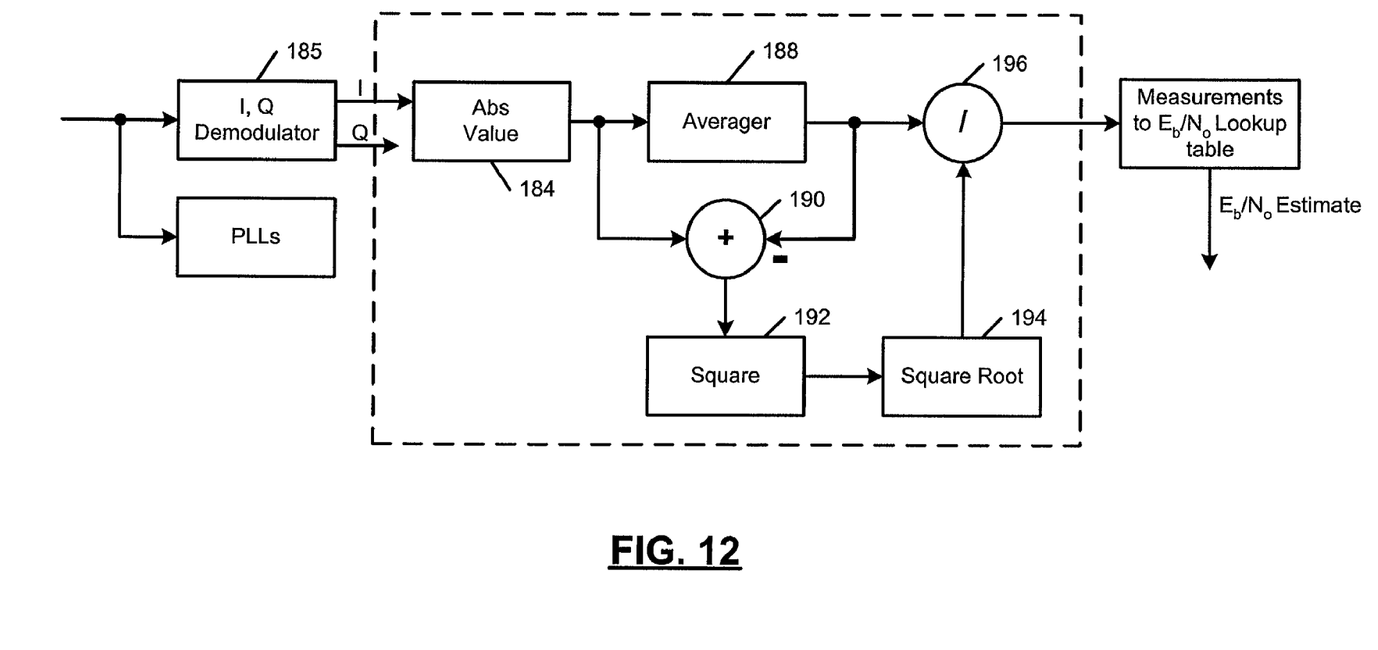
FIG. 12 illustrates an exemplary bit energy to noise generator.

Referring now to FIG. 12, an In Phase (I) output of an IQ demodulator is tapped by a bit energy and noise estimator 182. Outputs of the bit energy and noise estimator 182 are transmitted on the return link of the mobile platform 32 to the satellite 30 and the ground station 36. Outputs of the bit energy and noise estimator 156 are preferably used by the ground station to select the VLO code(s) for the services currently running on the mobile platform 32. The VLO feedback loop adjusts the VLO code at a rate that is sufficient to accommodate the time varying space and other losses and maintain the desired link margin, BER, and PER.

The bit energy and noise estimator 182 includes an absolute value circuit 184 that is connected to an I output of the IQ demodulator. An averager 188 and a summer 190 are connected to an output of the absolute value circuit 184. The summer 190 also receives an output of the averager 188. An output of the summer 190 is input to a square circuit 192. An output of the square circuit 192 is input to a square root circuit 194. An output of the averager 188 and the square root circuit 194 are input to a divider 196.

The frame overhead portion 106, the time sequence order portion 110 and the frame CRC portion 112 are preferably transmitted at the lowest data rate. The word sync portion of the frame overhead is 256 bits (for the slowest supported bit rate in a frame). This portion is used to ensure IQ phase is set in the correct quadrant and that there is proper frame sync. The frame CRC portion 112 includes the VLO overhead as part of its error detection responsibilities. The ordering of the blocks is set so that the lower data rate transceivers can switch off after demodulating their blocks to avoid incurring high BER when attempting to demodulate the faster data rate blocks.

The faster data rate transceivers accurately demodulate the lower data rate blocks by adjusting the VLO code despreader 164 based on the time sequence order portion 110. The faster data rate transceivers can discard the undesired blocks just as easily by achieving bit synchronization for the lower data rate blocks and switching in the FEC decoder when the faster blocks occur in the link layer frame. Another approach would be to vary the gain packet by packet through the transceiver and leave the transceiver in a fixed gain mode. Transient distortions as a consequence of the change in the transceiver amplification process might adversely affect adjacent blocks. The preferred mode for operating the satellite transceiver is near its saturation point of amplification using constant amplitude modulation techniques, such as the offset quadrature phase shift keying (OQPSK) modulation.

The present invention allows users in similar link margin regions to operate simultaneously with $E_b/N_o$ values that yield sufficiently low BER. As a result, the communication system has a low Internet protocol PER and improved IP throughput. The physical layer data rate is adapted to maintain a desired positive link margin. The present invention allows flexibility in bandwidth/data rate assignment for multiple users on a single transceiver or for multiple transceivers on the same mobile platform. A mixture of real time and IP data services can be delivered simultaneously using concurrent frames with different VLO codes. Different quality of service (QOS) can be delivered simultaneously to multiple users on a single transceiver or to multiple transceivers.

In a preferred embodiment, the multiple access coding is code division multiple access (CDMA). Frequency division multiple access (FDMA), time division multiple access (TDMA) or any other suitable multiple access coding could also be used. Another suitable multiple access coding method is disclosed in U.S. Pat. No. 5,103,459, which is hereby incorporated by reference.

Figure 13:
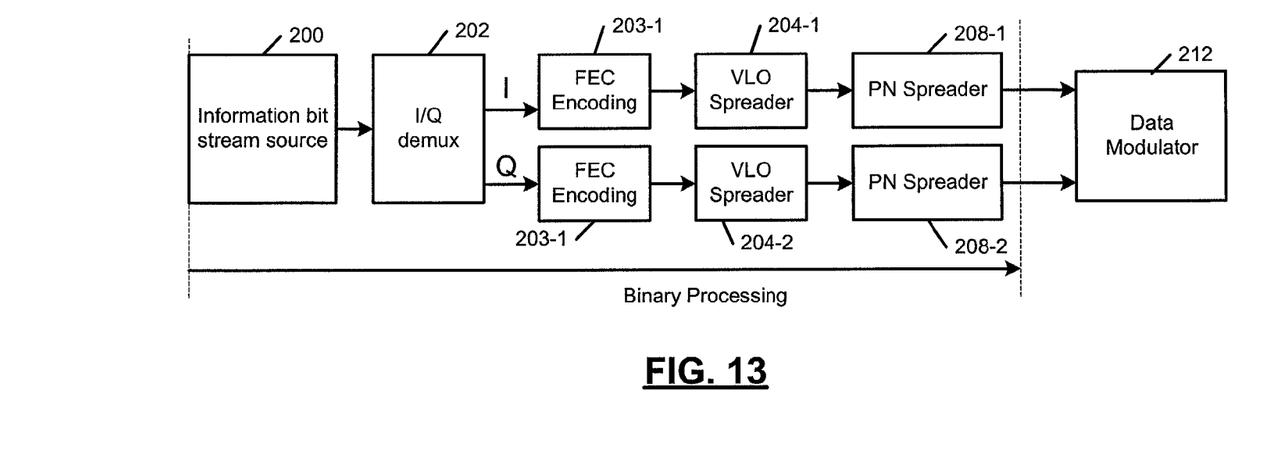
FIG. 13 is an exemplary illustration of binary processing of a transmitted information bit stream.

Referring now to FIG. 13, at the transmitter an information bit stream source 200 is output to an I/Q demultiplexer 202. An I output of the I/Q demultiplexer 202 is input to a FEC encoder 203-1 and then to a VLO spreader 204-1. A Q output of the I/Q demultiplexer 202 is input to a FEC encoder 203-2 and then to a VLO spreader 204-2. An output of the VLO spreader 204-1 is input to a PN spreader 208-1. An output of the VLO spreader 204-2 is input to a PN spreader 208-2. Outputs of the PN spreaders 208 are input to a data modulator 212. Use of VLO coding rate in combination with the use of the FEC coding rate allows finer incremental adjustment with respect to the knee of the BER versus $E_b/N_o$ curve of FIG. 7.

Figure 14:
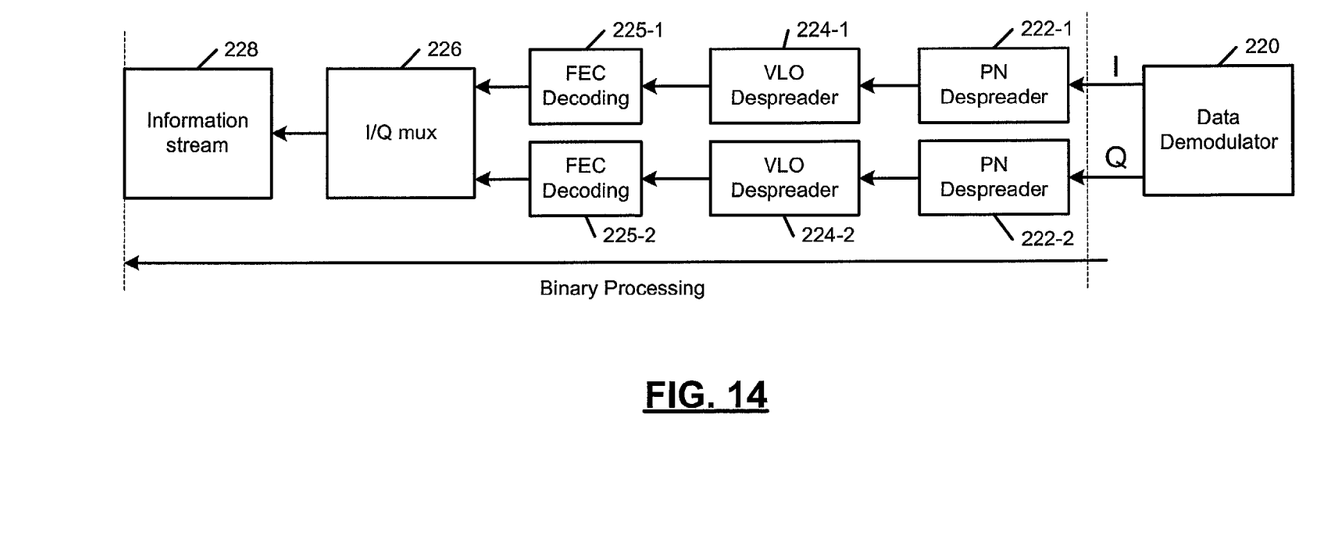
FIG. 14 is an exemplary illustration of binary processing of a received information bit stream.

Referring now FIG. 14, at the receiver a data demodulator 220 demodulates the data streams. PN and VLO despreaders 222 and 224 despread the data streams. FEC decoders 225 decode the data. An IQ multiplexer 226 multiplexes the data streams to produce an information stream 228.

Concurrent streams have orthogonal modulation during any information streams' bit time for any information stream data rate carried by concurrent information streams. This condition occurs at each data rate if the tree of FIG. 4 is used to assign data rates when code 1 is not used. Use of code 1 for concurrent VLO streams does not guarantee mutual orthogonality. If there are multiple streams with the same information rate, the streams can use all of the rates along a particular code. For instance, two concurrent data rate streams can use the code 2. Four concurrent streams can use the code 3.

For OQPSK modulation, the VLO and PN spreading are applied seperately to I and Q bits for the transmitter as shown in FIGS. 13 and 14. For the OQPSK receiver, the VLO and PN despreaders are applied to demodulated I bits and Q bits.

Figure 15:
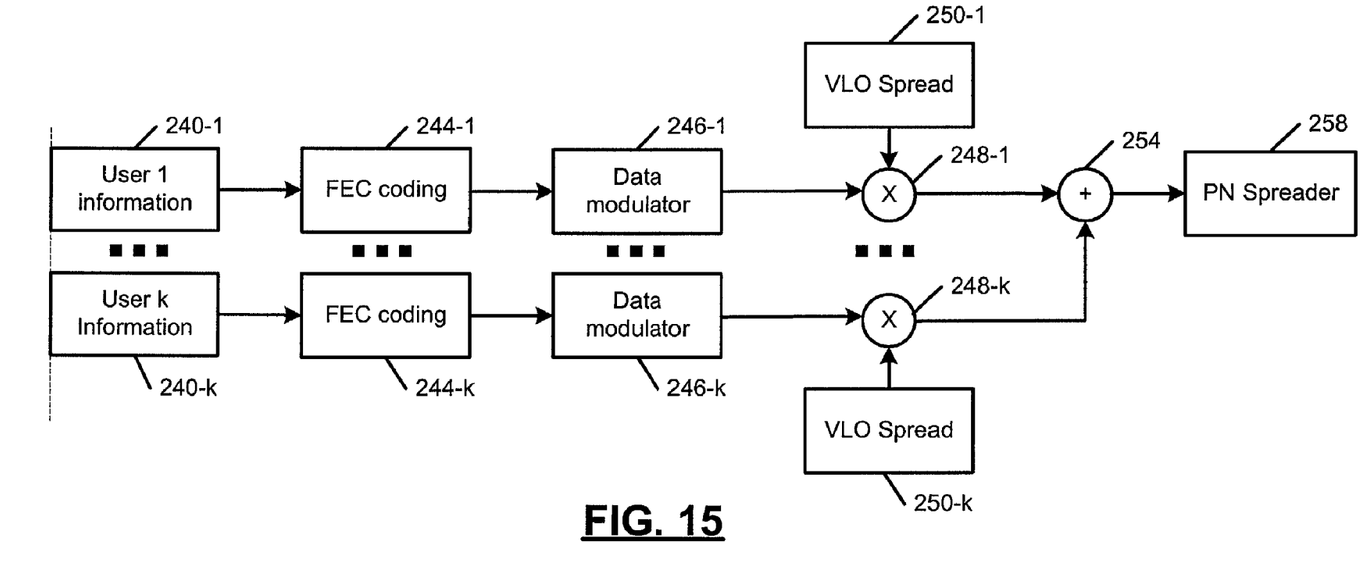
FIG. 15 is an exemplary illustration of binary processing for transmitting and receiving a bit stream, in accordance with various implementations of the present invention.

In another implementation of the transmitter and receiver that is shown in FIG. 15, the VLO spreading and PN spreading are applied after FEC coding and data modulation. User 1 information 240-1 is input to a FEC coder 244-1. An output of the FEC coder 244-1 is input to a data modulator 226-1. An output of the data modulator 226-1 is input to a multiplier 228-1. A VLO spreader 230-1 is also input to the multiplier 228-1. User k information 240-k is input to a FEC coder 244-k. An output of the FEC coder 244-k is input to a data modulator 226-k. An output of the data modulator 226-k is input to a multiplier 228-k. A VLO spreader 230-k is also input to the multiplier 228-k. Outputs of the multipliers 228 are input to an adder 234. An output of the adder in input to a PN spreader 238. For the receiver of the second implementation, the PN and VLO are applied prior to I/Q demodulation and FEC decoding.

Regarding maintaining an optimum distance from the knee of the BER curve, setting the FEC code rate in conjunction with setting the VLO code rate achieves the finest granularity and widest adaptation range. Whereas VLO code rate changes move in increments of 3 dB with respect to the BER versus $E_b/N_o$ curve, FEC code rate changes typically move in increments of 0.5 to 1 dB. When FEC code rate and VLO code rate are used together, for example with codes 2 to 4, the code rate change can effect a 6 dB dynamic range of adjustment with adjustment in 0.5 dB increments.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A communication system for mobile platforms, comprising:
    a first mobile platform including a first transceiver that is assigned a first Internet Protocol (IP) address;
    a second mobile platform including a second transceiver that is assigned a second IP address; and
    a ground station adapted to:
    transmit a forward link that contains an entire first IP packet having a first information data rate, said first IP packet modulated with code division multiple access (CDMA) coding in combination with a first variable length orthogonal (VLO) code such that said entire first IP packet is relayed, via said forward link, from a ground station to said first mobile platform through a selected channel of a satellite having a transceiver amplifier operating approximately at a saturation point of said amplifier, and
    transmit said forward link concurrently containing an entire second IP packet simultaneously modulated with CDMA coding in combination with a second VLO code such that said entire second IP packet is relayed, via said forward link, from said ground station to said second mobile platform through said selected satellite channel with said satellite transceiver operating approximately at said saturation point.

2. The communications system of claim 1 wherein said ground station includes a packet organizer that groups IP packets based on an information data rate of said IP packets.

3. The communication system of claim 1 wherein said ground station includes a forward error correction (FEC) encoder that applies FEC coding to said first and second IP packet data and wherein said VLO spreader communicates with an output of said FEC encoder.

4. The communication system of claim 3 wherein said ground station includes a pseudonoise (PN) spreader that spreads an output of said VLO spreader.

5. The communication system of claim 4 wherein said first and second mobile platforms include a pseudonoise (PN) despreader that despreads data received on said forward link.

6. The communication system of claim 5 wherein said first and second mobile platforms include a VLO despreader that despreads an output of said PN despreader.

7. The communication system of claim 6 wherein said first and second mobile platforms include a FEC decoder that decodes an output of said PN despreader.

8. The communication system of claim 7 wherein said ground station selects a first VLO spreading code to optimize a first desired link margin of said first transceiver and a second VLO spreading code is selected to optimize a second desired link margin of said second transceiver.

9. The communication system of claim 8 wherein said first transceiver includes a feedback circuit that generates a link margin estimate for said first IP packet received by said first transceiver.

10. The communication system of claim 9 wherein said ground station receives said link margin estimate and adjusts said information data rate of subsequent IP packets.

11. The communication system of claim 10 wherein said feedback circuit of said first transceiver includes:
    a signal estimator that generates a bit energy signal; and
    a noise estimator that generates a noise estimate signal.

12. The communication system of claim 11 wherein said feedback circuit transmits said link margin estimate to said ground station.

13. The communication system of claim 12 wherein said ground station adjusts said VLO spreading code to optimize said link margin of said first transceiver.

14. The communication system of claim 13 wherein said ground station adjusts said VLO spreading code and FEC coding of said FEC encoder to optimize said link margin of said first transceiver.

15. The communication system of claim 13 wherein said VLO code despreader responds to VLO timing sequence data contained in an overhead portion of an output of said PN despreader.

16. The communication system of claim 1 wherein said first IP packet is addressed to said first transceiver located on said first mobile platform and said second IP packet is addressed to said second transceiver located on a second mobile platform.

17. The communication system of claim 1 wherein said forward link includes first and second broadcast frames that are transmitted concurrently.

18. The communication system of claim 17 wherein said concurrent broadcast frames have distinct VLO codes and substantially the same signal strength.

19. A method for communicating with mobile platforms, comprising:
    assigning a first Internet Protocol (IP) address to a first mobile platform including a first transceiver;
    assigning a second IP address to a second mobile platform including a second transceiver;
    transmitting a forward link that concurrently contains an entire first IP packet having a first information data rate and an entire second IP packet having a second information data rate from a ground station;

modulating said entire first IP packet with a first variable length orthogonal (VLO) code, using a VLO spreader, in combination with code division multiple access (CDMA) coding such that said entire first IP packet can be relayed, via said forward link, from a ground station to said first mobile platform through a selected channel of a satellite having a transceiver amplifier operating approximately at a saturation point of said amplifier; and simultaneously modulating said entire second IP packet with a second VLO, using the VLO spreader, in combination with CDMA coding, such that said entire second IP packet is relayed, via said forward link, from said around station to said second mobile platform through said selected satellite channel with said satellite transceiver amplifier operating approximately at said saturation point.

20. The method of claim 19 further comprising organizing IP packets at said ground station based on an information data rate of said IP packets.

21. The method of claim 19 further comprising applying forward error correction (FEC) coding prior to said step of modulating.

22. The method of claim 21 further comprising spreading an output of said VLO spreader using a pseudonoise (PN) spreader.

23. The method of claim 22 further comprising despreading data received on said forward link using a PN despreader of said first and second mobile platforms.

24. The method of claim 23 further comprising despreading an output of said PN despreader using a VLO despreader.

25. The method of claim 24 further comprising decoding an output of said FEC decoder using a FEC decoder of said first and second mobile platforms.

26. The method of claim 25 further comprising:
selecting a first VLO spreading code to optimize a first desired link margin of said first transceiver; and
selecting a second VLO spreading code to optimize a second desired link margin of said second transceiver.

27. The method of claim 26 further comprising:
generating a link margin estimate for said first IP packet received by said first transceiver; and
transmitting said link margin estimate to said ground station.

28. The method of claim 27 further comprising:
receiving said link margin estimate at said ground station; and adjusting
said information data rate of said subsequent IP packets.

29. The method of claim 28 wherein said step of generating said link margin estimate further comprises:
generating a bit energy signal; and
generating a noise estimate signal.

30. The method of claim 29 further comprising adjusting said VLO spreading code to optimize said link margin of said first transceiver.

31. The method of claim 29 further comprising adjusting said VLO spreading code and said FEC encoding to optimize said link margin of said first transceiver.

32. The method of claim 30 further comprising responding to VLO timing sequence data contained in an overhead portion of an output of said PN despreader using said VLO decoder.

33. The method of claim 32 further comprising:
addressing said first IP packet to said first transceiver located on said first mobile platform; and
addressing said second IP packet to said second transceiver located on a second mobile platform.

34. The method of claim 19 wherein said forward link includes first and second broadcast frames that are transmitted concurrently.

35. The method of claim 34 wherein said concurrent broadcast frames have distinct VLO codes and substantially the same signal strength.

* * * * *